(12) United States Patent
Soryal et al.

(10) Patent No.: US 11,218,486 B2
(45) Date of Patent: *Jan. 4, 2022

(54) EDGE-NODE AUTHENTICATION FOR FUNCTIONS AS A SERVICE

(71) Applicant: AT&T Intellectual Property I, L.P., Atlanta, GA (US)

(72) Inventors: Joseph Soryal, Ridgewood, NY (US); Daniel Yaniro, Jr., Freehold, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 302 days.

This patent is subject to a terminal disclaimer.

(21) Appl. No.: 16/416,680

(22) Filed: May 20, 2019

(65) Prior Publication Data

US 2020/0374291 A1    Nov. 26, 2020

(51) Int. Cl.
*H04L 29/06*    (2006.01)

(52) U.S. Cl.
CPC ............ *H04L 63/102* (2013.01); *H04L 63/08* (2013.01); *H04L 63/105* (2013.01); *H04L 63/108* (2013.01); *H04L 63/1458* (2013.01)

(58) Field of Classification Search
CPC ..... H04L 63/102; H04L 63/08; H04L 63/105; H04L 63/108; H04L 63/1458; H04L 63/0884
See application file for complete search history.

(56) References Cited

U.S. PATENT DOCUMENTS

| | | | |
|---|---|---|---|
| 2018/0034714 A1* | 2/2018 | Zhang | H04L 41/0806 |
| 2018/0234308 A1* | 8/2018 | Bruun | H04L 41/5054 |
| 2018/0262431 A1 | 9/2018 | Zhang et al. | |
| 2020/0067800 A1* | 2/2020 | Wang | H04L 41/12 |

* cited by examiner

*Primary Examiner* — Khoi V Le
(74) *Attorney, Agent, or Firm* — Guntin & Gust, PLC; John G. Rauch

(57) ABSTRACT

A method includes identifying a first validation parameter of a first network node and a second validation parameter of a second network node. The method includes creating an authentication node based on the first and second validation parameters. The method also includes receiving a request to access a microservice that utilizes the first network node and the second network node. The authentication node analyzes the request to make a validation determination indicative of whether the request satisfies the first and second validation parameters and controls access to the microservice based on the validation determination.

20 Claims, 3 Drawing Sheets

EDGE-NODE AUTHENTICATION FOR FUNCTIONS AS A SERVICE

BACKGROUND

In traditional networks, authentication functions are handled by a firewall. While firewall authentication technology can offer robust protection, updating or changing authentication settings at the firewall can be costly, both in terms of ramp-up time and developer effort. These limitations frustrate the purpose of serverless architectures and other cloud computing methodologies, particularly in instances where authentication needs are specific to a particular microservice, or even are specific to a particular instantiation thereof.

Authentication for network nodes in a serverless architecture is handled at each node. Applications built for serverless architectures may contain dozens—or even hundreds—of serverless functions, each with a specific purpose. These functions may connect together to form overall system logic, but may require different authentication information at each function. These functions may be spun up and changed every few milliseconds. These functions can be attractive targets for DOS attacks and other malicious activity. Such malicious activity can result in the network owner incurring unnecessary costs associated with ramping up such functions.

Thus, there is a need to develop authentication technology that can reduce the risk of unnecessary network costs associated with malicious activity.

SUMMARY

The disclosed systems, methods, and apparatuses allow for authentication to facilitate development and use of virtualized environments, serverless architectures, and functions as a service ("FaaS").

In an aspect, this disclosure is directed to a method. The method may include parsing code of a first network node to identify a first validation parameter and tracing a route to determine connectivity between the network node and a second network node. The method may also include parsing code of the second network node to identify a second validation parameter and creating an authentication node based on the first and second validation parameters. The method may also include receiving a request to access a microservice that utilizes the first network node and the second network node and analyzing, by the authentication node, the request to make a validation determination indicative of whether the request satisfies the first and second validation parameters. The method also includes controlling, by the authentication node, access to the microservice based on the validation determination.

In another aspect, this disclosure is directed to a method. The method may include identifying a first validation parameter of a first network node and a second validation parameter of a second network node. The method includes creating an authentication node based on the first and second validation parameters. The method may also include receiving a request to access a microservice that utilizes the first network node and the second network node. The method may also include analyzing, by the authentication node, the request to make a validation determination indicative of whether the request satisfies the first and second validation parameters and controlling, by the authentication node, access to the microservice based on the validation determination.

According to another aspect, this disclosure is directed to a system. The system may include a processor and memory storing executable instructions that cause the processor to effectuate operations. The operations may include parsing code of a first network node to identify a first validation parameter. The operations may also include tracing a route to determine connectivity between the network node and a second network node. The operations may also include parsing code of the second network node to identify a second validation parameter and creating an authentication node based on the first and second validation parameters. The authentication node may be configured to receive a request to access a microservice that utilizes the first network node and the second network node. The authentication node may be further configured to make a validation determination based on the request and control access to the microservice based on the validation determination.

BRIEF DESCRIPTION OF THE DRAWINGS

Aspects of the herein authentication technology are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Where convenient, like numbers refer to like elements.

DETAILED DESCRIPTION

Authentication may be a challenge in serverless architectures and, more specifically, FaaS architectures. For example, each node may require a different set of authentication mechanisms or requirements, such as different digital certificates, usernames or passwords. It is possible for a transaction to spin up multiple nodes on a path, satisfying the associated authentication requirements, only to be blocked from proceeding further down a path to complete the transaction, based on authentication requirements of those later nodes. A miniaturized authentication node can verify some or all of the authentication requirements of an entire transaction at the beginning of the exchange. Thus, it can be determined whether other nodes within the transaction should be spun up (built or instantiated), or whether such actions would be a waste of resources, such as the case where the transaction could never be completed based on the credentials associated with the entity requesting the transaction.

Figure 1:
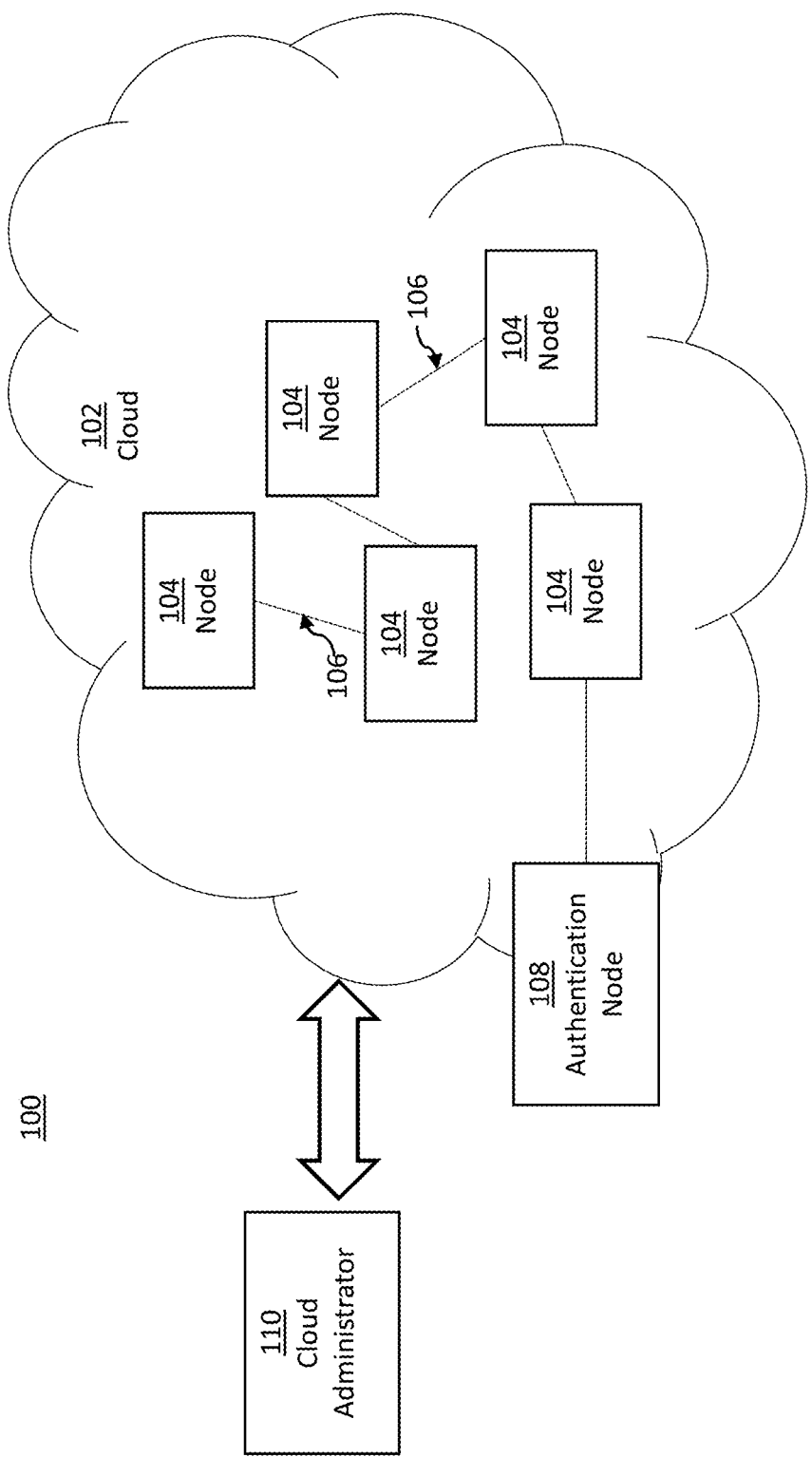
FIG. 1 is a schematic of a virtualized system for cloud computing in which authentication nodes can be incorporated.

FIG. 1 is a high-level schematic of a system 100 in which FaaS can deployed. System 100 includes additional functionality for authentication procedures related to FaaS deployment and use. Generally, system 100 may include a cloud environment 102 in which nodes 104 may operate. Environment 102 may be a public or private cloud. Environment 102 may have a serverless architecture, in which server management and low-level infrastructure decisions are handled by a cloud administrator 106. Such models may simplify the tasks of developers in creating and operating applications by handling allocation of resources at the cloud level rather than at the application level.

Each node 104 may be a unit of software functionality. For example, node 104 may be a virtual machine. A virtual machine may be a software implementation of a machine (e.g., a computer) that execute programs or functionality like a physical machine. Virtual machines can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., environment 102) a particular virtual machine may be provisioned on any one (or multiple) of the devices included in cloud environment 102

Additionally or alternatively, node 104 may be a smaller software unit, such as a microservice, or, even smaller, a virtual function, such as an FaaS. These nodes 104 may be modular functions that can execute and scale independently within environment 102. Multiple FaaSes (e.g. nodes 104) may form a microservice. A microservice may operate as a service, such as one used by one or more applications. Multiple microservices may form an application. In FaaS models, nodes 104 may be more responsive to changes in demand, spinning up and destructing dynamically.

Serverless architecture, like that of system 100, allows for nodes 104, and pathways 106 between such nodes, to spin up in response to a request. For example, a shopping website may use four nodes 104: an inventory database, a pricing database, an ordering system, and a credit card processing system. In response to demand, nodes 104 for each of these functions may spin up, and pathways 106 may connect nodes 104 together. For example, an ordering system node 104 may communicate with a pricing database node 104 to obtain price information in response to a request to view or add-to-cart a product for sale based on information received from an inventory database node 104 and/or user input. A data transmission may enter these components of a shopping website through one or more of the aforementioned nodes 104, and interact with multiple nodes 104 along pathway 106. For example, the ordering system node 104 may pass along a component of the data transmission it received to a second node, like the pricing node 104, but may otherwise not evaluate that data transmission component. Thus, when that data transmission component reaches the second node 104, that second node 104 may determine that the data transmission component is unauthorized and the request to system 100 may be rejected.

System 100 may include an authentication node 108 that verifies certain information regarding a data transmission before permitting that transmission to traverse deeper into cloud environment 102. This verification can be basic: like confirming the incoming message complies with a message format accepted by one or more of the nodes 104 it seeks to interact with. Additionally or alternatively, the verification can be complex, like verifying that the requesting entity is authorized to access or communicate with node 104 (or collection of nodes 104) that the requesting entity seeks to access.

Authentication node 108 may comprise an edge node that sits at the edge of cloud environment 102, so that any unauthorized requests may be restricted as early as possible. In another instance, authentication node 108 may reside within the cloud (e.g., cloud environment 102), as other nodes 104 reside in the cloud. As authentication nodes 108 are dynamically creatable and may be created in conjunction with or subsequent to the creation of nodes 104 comprising the microservice for which authentication node 108 may provide authentication services for. Thus, the location of authentication node 108 may be in proximity to other nodes 104 within cloud environment 102.

Verifying this information at the authentication node 108 can prevent the likelihood that malicious or corrupt requests take up the resources of the cloud environment 102. For example, in some circumstances, it may be possible for a request to traverse multiple nodes 104 used by a service before that request is ultimately rejected by the Nth node 104 used by the service the request is accessing for failing to have proper credentials. Instead of allowing that request to use the resources of all N−1 nodes 104 within that series, authentication node 108 can determine at the outset whether the request should be permitted to proceed past authentication node 108. In this sense, the authentication node 108 acts like a gatekeeper for microservices and services that may utilize nodes 104.

To perform a microservice (or service), pathways 106 may connect nodes 104 whose interaction facilitates performance of the service. For authentication node 108 to pre-approve the authentication parameters, it may trace pathways 106 to identify subsequent nodes 104 utilized by that microservice or service. In this manner, authentication node 108 may gather the authentication parameters for that microservice or service.

Figure 2:
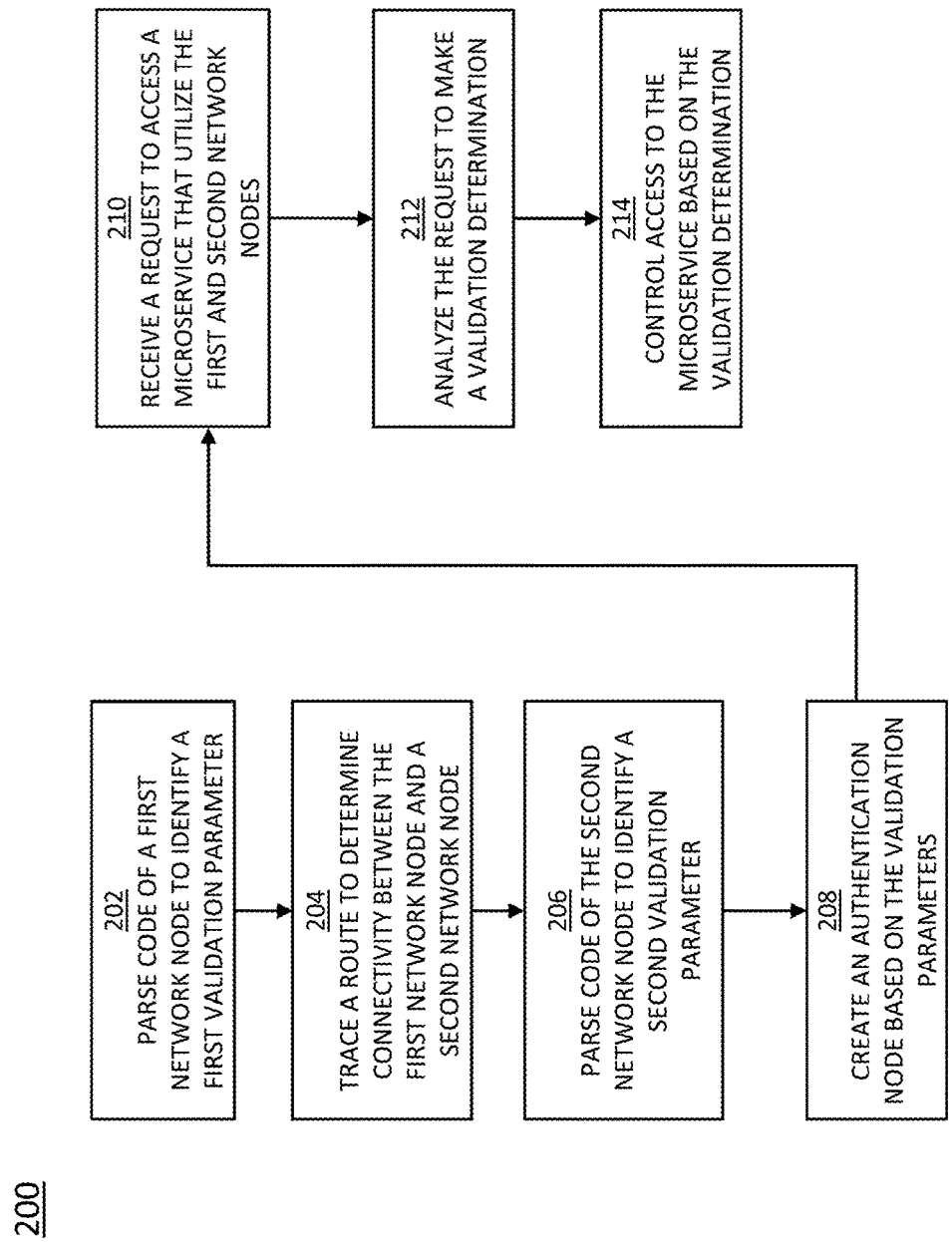
FIG. 2 is a flowchart of an exemplary method of creating and using an authentication node.

FIG. 2 illustrates a method 200 by which authentication node 108 functions. The steps of method 200 may be performed by network administrator 110. Additionally or alternatively, these steps may be performed by authentication node 108 or other components of cloud 102.

At step 202, method 200 may include parsing code of a first network node 104 to identify a first validation parameter. As discussed above, the validation parameters may confirm that the input to the first network node 104 conforms to the parameters expected or required by that first network node 104. These types of parameters may include an input message format, a message length, an input file type, an input size, a type of requesting device providing the input to first network node 104, or the like. Additionally or alternatively, the validation parameters may confirm that the input satisfies an authentication microservice (e.g., that the request is an authorized input). These types of parameters may include an identifier identifying the source of the request, a password, an encryption key, a second factor authentication, or the like.

Additionally or alternatively, method 200 may include determining validation parameters based on other means. For example, nodes 104 may be configured to respond to certain types of requests by indicating their validation parameters.

At step 204, method 200 may include tracing a route to determine connectivity between the first network node 104 and a second network node 104. This functionality may be used to identify subsequent network nodes 104 that a request, first received by the first network node 104, would then attempt to access.

Once subsequent network nodes 104 are identified, at step 206, other validation parameters may be identified. For example, code of second network node 104 may be parsed to identify a second validation parameter. This process may continue to identify all validation parameters that may ultimately be checked by nodes 104 when a request is provided a service that utilizes those nodes 104.

At step 208, an authentication node 108 may be created based on the validation parameters. In another instance, each authentication node 108 may be designed to handle each microservice and service provided by cloud 102. In some implementations, authentication node 108 may check or precheck the validation parameters associated with the nodes 104 that a request may access (or attempt to access).

At step 210, method 200 may include receiving a request to access a microservice that utilizes first and second network nodes 104. At step 212, authentication node 108 may then analyze the request to make a validation determination. The validation determination may confirm whether the request satisfies or complies with the validation parameters. This may include identifying whether the request satisfies certain optional validation parameters. For example, a basic authentication parameters may exist for a request to simply access the microservice, while optional authentication parameters (e.g., admin privileges) may restrict access to certain features or components of the microservice.

At step 214, authentication node 108 may control access to the microservice based on the validation determination. In instances in which the request complies with all validation parameters, the authentication node 108 may permit unrestricted access. In instances where the request complies with all required validation parameters, but does not comply with all optional validation parameters, authentication node 108 may provide restricted access to the microservice. This may include, for example, preemptively prevent the request from requesting access to one of the optional nodes 104 within the microservice. In instances where the request does not comply with all required validation parameters, the authentication node 108 may deny the request. Denial or limitation of access may prevent unnecessary nodes 104 from being instantiated to respond to the request.

When a request is permitted, instantiations of first node and second node may be built so that the request can make use of the service. By waiting until the request has been approved by authentication node 108, the building of unnecessary instantiations may be avoided. The request may then be directed to the instantiations to access the microservice.

There may be circumstances in which a request is permitted to access the microservice, but may still waste resources. This may occur, for example, when the request is corrupt, a node 104 malfunctions, or if the request is a malicious attack. Thus, authentication node 108 may perform additional services to terminate such requests. For example, authentication node 108 may determine an expected travel time for providing a response to the request. This expected travel time may be based on a number of parameters, such as the functionality of nodes 104 used by the microservice, and the route connecting such nodes. Once authentication node 108 permits a request to access the microservice, authentication node 108 may measure the travel time of the request accessing that microservice. This measurement may be measured from a number of points in time, such as starting when instantiations of nodes 104 of the microservice are first built, to when they are spun down, or based on when the entity requesting the microservice disengages from cloud 102. Authentication node 108 may terminate access to cloud 102 based on determining that the travel time of the request exceeds an expected travel time.

Functionality may also be included to prevent future requests. For example, the source of the request may be blocked from making future requests based on the request not satisfying a validation parameter or its request having been terminated by authentication node 108. Authentication node 108 may block that source from submitting additional requests to the network.

Figure 3:
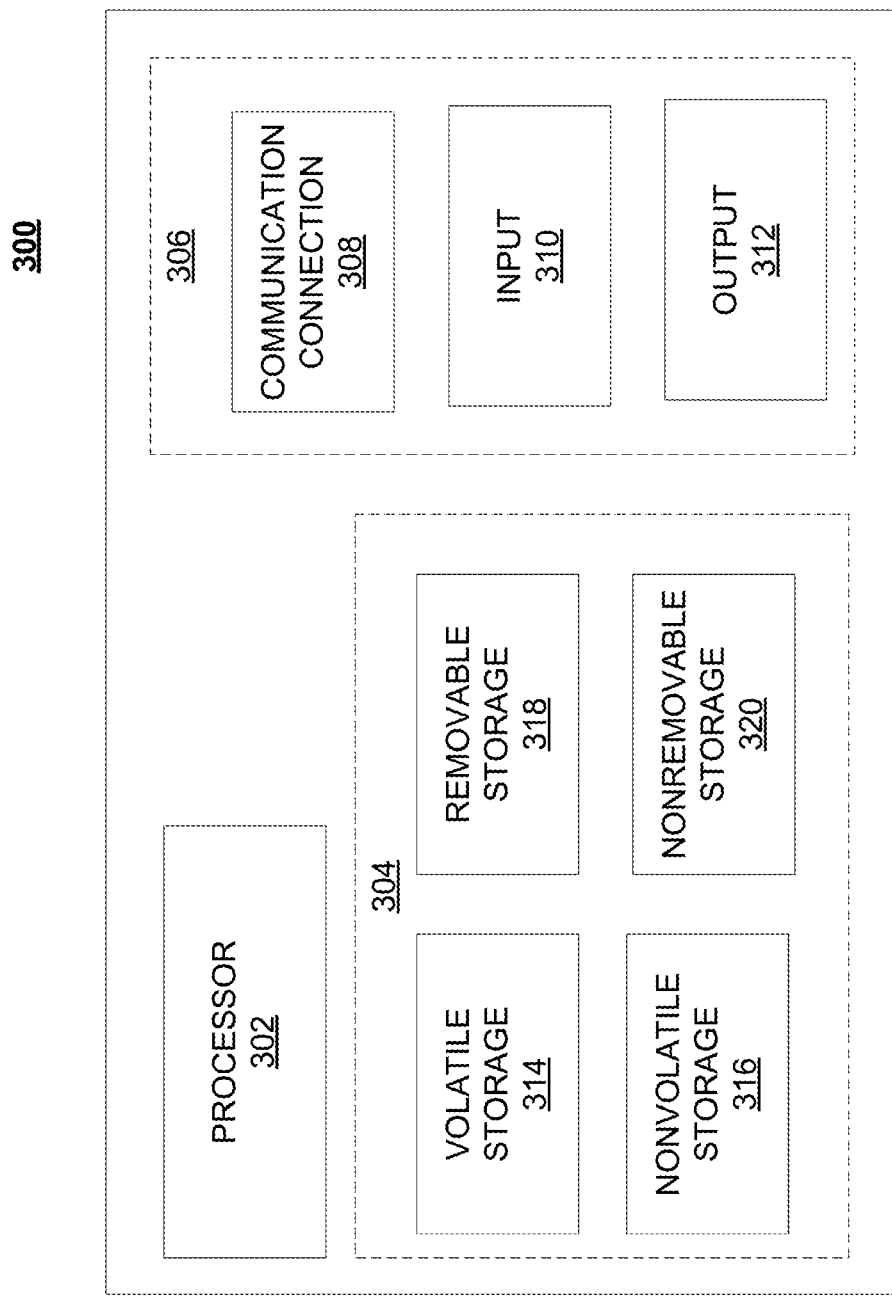
FIG. 3 is a schematic of an exemplary device that may be a component of the system of FIG. 1.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a networking environment, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

What is claimed:

1. A computer-implemented method, the computer-implemented method comprising:
    parsing code of a first network node, by a hardware processor, to identify a first validation parameter;
    tracing a route to determine connectivity between the first network node and a second network node;
    parsing code of the second network node to identify a second validation parameter;
    creating an authentication node based on the first and second validation parameters;
    receiving a request to access a microservice that utilizes the first network node and the second network node;
    analyzing, by the authentication node, the request to make a validation determination indicative of whether the request satisfies the first and second validation parameters; and
    controlling, by the authentication node, access to the microservice based on the validation determination to reduce network costs associated with malicious activity.

2. The method of claim 1, wherein the authentication node comprises an edge node.

3. The method of claim 1, wherein the request satisfies the first and second validation parameters, the method further comprising:
    building an instantiation of the first network node and the second network node; and
    directing the request to access the microservice based on the instantiations.

4. The method of claim 3, further comprising:
    based on at least the route, determining an expected travel time for providing a response to the request;
    measuring a travel time of the request;
    determining that the travel time exceeds the expected travel time; and
    terminating the request based on the travel time exceeding the expected travel time.

5. The method of claim 4, further comprising:
    blocking future requests from a source of the request.

6. The method of claim 1, wherein the request does not satisfy at least one of the first and second validation parameters and controlling access comprises rejecting the request.

7. The method of claim 1, wherein the first and second validation parameters comprise a message format.

8. The method of claim 1, wherein the first and second validation parameters comprise a message length.

9. The method of claim 1, wherein the first network node and second network node comprise an authentication microfunction, the method further comprising authenticating, by the authentication node, the request based on the authentication microfunction.

10. A computer-implemented method, the computer-implemented method comprising:
    identifying, by a hardware processor, a first validation parameter of a first network node and a second validation parameter, of a second network node;
    creating an authentication node based on the first and second validation parameters;
    receiving a request to access a microservice that utilizes the first network node and the second network node;
    analyzing, by the authentication node, the request to make a validation determination indicative of whether the request satisfies the first and second validation parameters; and
    controlling, by the authentication node, access to the microservice based on the validation determination to reduce network costs associated with malicious activity.

11. The method of claim 10, wherein the first validation parameter comprises a message format.

12. The method of claim 10, wherein the second validation parameter comprises an authentication parameter.

13. The method of claim 10, further comprising:
    measuring an amount of time associated with the request to access the microservice.

14. The method of claim 13, further comprising:
terminating access to the microservice based on the amount of time exceeding an access time threshold.

15. The method of claim 14, wherein the access time threshold is based upon an expected amount of time for performing the microservice.

16. A system comprising:
a hardware processor; and
memory storing executable instructions that cause the hardware processor to effectuate operations, the operations comprising:
parsing, by the hardware processor, code of a first network node to identify a first validation parameter;
tracing a route to determine connectivity between the first network node and a second network node;
parsing code of the second network node to identify a second validation parameter; and
creating an authentication node based on the first and second validation parameters,
wherein the authentication node is configured to:
receive a request to access a microservice that utilizes the first network node and the second network node;
make a validation determination based on the request; and
control access to the microservice based on the validation determination to reduce network costs associated with malicious activity.

17. The system of claim 16, wherein the validation determination is based on whether the request satisfies the first and second validation parameters.

18. The system of claim 16, wherein the first and second validation parameters comprise a message format.

19. The system of claim 16, wherein the first and second validation parameters comprise an authentication parameter.

20. The system of claim 16 wherein the authentication node is further configured to terminate access to the microservice after an amount of time as elapsed.

* * * * *

UNITED STATES PATENT AND TRADEMARK OFFICE
CERTIFICATE OF CORRECTION

| | | |
|---|---|---|
| PATENT NO. | : 11,218,486 B2 | Page 1 of 1 |
| APPLICATION NO. | : 16/416680 | |
| DATED | : January 4, 2022 | |
| INVENTOR(S) | : Soryal et al. | |

It is certified that error appears in the above-identified patent and that said Letters Patent is hereby corrected as shown below:

On the Title Page

Item (54) and in the Specification Column 1 Lines 1-2 please delete "EDGE-NODE AUTHENTICATION FOR FUNCTIONS AS A SERVICE" and replace with --EDGE-NODE AUTHENTICATION AND SECURITY FOR FUNCTIONS AS A SERVICE--

<div style="text-align: right;">
Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*
</div>